United States Patent
Kwan et al.

(10) Patent No.: US 9,640,347 B2
(45) Date of Patent: May 2, 2017

(54) KEYCAPS WITH REDUCED THICKNESS

(71) Applicant: Apple Inc., Cupertino, CA (US)

(72) Inventors: Hilbert T. Kwan, Cupertino, CA (US);
Jeffrey L. Yen, Cupertino, CA (US);
Craig C. Leong, Cupertino, CA (US);
James J. Niu, Cupertino, CA (US);
Keith J. Hendren, Cupertino, CA (US);
Yanyang Yuan, Cupertino, CA (US);
Feng Zhao, Cupertino, CA (US);
Wanshan Li, Cupertino, CA (US);
Derrick T. Jue, Cupertino, CA (US);
Ze Hong, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/501,121

(22) Filed: Sep. 30, 2014

(65) Prior Publication Data

US 2015/0090570 A1 Apr. 2, 2015

Related U.S. Application Data

(60) Provisional application No. 61/884,241, filed on Sep. 30, 2013.

(51) Int. Cl.
*H01H 13/83* (2006.01)
*B05D 5/06* (2006.01)
(Continued)

(52) U.S. Cl.
CPC .............. *H01H 13/83* (2013.01); *B05D 5/06* (2013.01); *B23K 26/38* (2013.01); *G06F 3/0202* (2013.01);
(Continued)

(58) Field of Classification Search
CPC ........ H01H 3/125; H01H 13/83; H01H 13/84; G06F 3/02; G06F 3/0202
See application file for complete search history.

(56) References Cited

U.S. PATENT DOCUMENTS 3,657,492 A  4/1972 Arndt et al.
3,917,917 A  11/1975 Murata
(Continued)

FOREIGN PATENT DOCUMENTS

CN  2155620  2/1994
CN  2394309  8/2000
(Continued)

OTHER PUBLICATIONS

Invitation to Pay Additional Fees, PCT/US2014/053533, 5 pages, Nov. 13, 2014.
(Continued)

*Primary Examiner* — David Banh
(74) *Attorney, Agent, or Firm* — Brownstein Hyatt Farber Schreck, LLP

(57) ABSTRACT

An illuminated metal keycap having a legend diffuser material that may diffuse light through a legend opened in a background layer. The background layer may be opaque and the legend may be transparent. The metal keycap is adhered to a scissor mechanism positioned above electrical switch circuitry. Included within, below, or adjacent to the scissor mechanism may be one or more light sources positioned to emit light through the metal keycap, around the perimeter of the metal keycap, and/or through the background layer.

23 Claims, 14 Drawing Sheets

(51) Int. Cl.
   *B23K 26/38* (2014.01)
   *G06F 3/02* (2006.01)
   *H01H 13/88* (2006.01)
   *H01H 3/12* (2006.01)

(52) U.S. Cl.
   CPC .......... *H01H 3/125* (2013.01); *H01H 13/88* (2013.01); *H01H 2219/028* (2013.01); *H01H 2219/039* (2013.01); *H01H 2219/056* (2013.01); *H01H 2221/058* (2013.01); *H01H 2221/07* (2013.01); *H01H 2229/02* (2013.01); *Y10T 29/49826* (2015.01)

(56) References Cited

U.S. PATENT DOCUMENTS

| | | |
|---|---|---|
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,670,084 A | 6/1987 | Durand et al. |
| 4,755,645 A | 7/1988 | Naoki et al. |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,382,762 A | 1/1995 | Mochizuki |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,804,780 A | 9/1998 | Bartha |
| 5,828,015 A | 10/1998 | Coulon |
| 5,847,337 A | 12/1998 | Chen |
| 5,876,106 A | 3/1999 | Kordecki et al. |
| 5,878,872 A | 3/1999 | Tsai |
| 5,881,866 A | 3/1999 | Miyajima et al. |
| 5,935,691 A * | 8/1999 | Tsai ..................... 428/195.1 |
| 5,986,227 A | 11/1999 | Hon |
| 6,020,565 A | 2/2000 | Pan |
| 6,215,420 B1 | 4/2001 | Harrison et al. |
| 6,257,782 B1 | 7/2001 | Maruyama et al. |
| 6,377,685 B1 | 4/2002 | Krishnan |
| 6,388,219 B2 | 5/2002 | Hsu et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,706,986 B2 | 3/2004 | Hsu |
| 6,750,414 B2 | 6/2004 | Sullivan |
| 6,759,614 B2 | 7/2004 | Yoneyama |
| 6,762,381 B2 * | 7/2004 | Kunthady et al. ......... 200/512 |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,926,418 B2 | 8/2005 | Osterg.ang.rd et al. |
| 6,940,030 B2 | 9/2005 | Takeda et al. |
| 6,977,352 B2 | 12/2005 | Oosawa |
| 6,979,792 B1 | 12/2005 | Tsai |
| 6,987,466 B1 | 1/2006 | Welch et al. |
| 6,987,503 B2 | 1/2006 | Inoue |
| 7,012,206 B2 | 3/2006 | Oikawa |
| 7,038,832 B2 | 5/2006 | Kanbe |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,639,187 B2 | 12/2009 | Caballero et al. |
| 7,679,010 B2 | 3/2010 | Wingett |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,080,744 B2 | 12/2011 | Yeh et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 8/2012 | Chen |
| 8,263,887 B2 | 9/2012 | Chen et al. |
| 8,289,280 B2 | 10/2012 | Travis |
| 8,317,384 B2 | 11/2012 | Chung et al. |
| 8,319,298 B2 | 11/2012 | Hsu |
| 8,330,725 B2 * | 12/2012 | Mahowald et al. ......... 345/170 |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,431,849 B2 | 4/2013 | Chen |
| 8,436,265 B2 | 5/2013 | Koike et al. |
| 8,451,146 B2 | 5/2013 | Mahowald et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,651,720 B2 | 2/2014 | Sherman et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |

(56) References Cited

U.S. PATENT DOCUMENTS

| | | |
|---|---|---|
| 8,847,711 B2 | 9/2014 | Yang et al. |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,063,627 B2 | 6/2015 | Yairi et al. |
| 9,086,733 B2 | 7/2015 | Pance |
| 9,087,663 B2 | 7/2015 | Los |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,275,810 B2 | 3/2016 | Pance et al. |
| 9,305,496 B2 | 4/2016 | Kimura |
| 2002/0079211 A1 | 6/2002 | Katayama et al. |
| 2002/0093436 A1 | 7/2002 | Lien |
| 2002/0149835 A1 | 10/2002 | Kanbe |
| 2003/0169232 A1 | 9/2003 | Ito |
| 2004/0257247 A1 | 12/2004 | Lin et al. |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2009/0046053 A1 | 2/2009 | Shigehiro et al. |
| 2009/0103964 A1* | 4/2009 | Takagi et al. ............... 400/495 |
| 2009/0128496 A1 | 5/2009 | Huang |
| 2009/0262085 A1 | 10/2009 | Wassingbo et al. |
| 2010/0066568 A1* | 3/2010 | Lee ............................ 341/22 |
| 2010/0156796 A1 | 6/2010 | Kim et al. |
| 2010/0163389 A1* | 7/2010 | Tsao et al. ................. 200/5 E |
| 2010/0187079 A1* | 7/2010 | Dumont et al. ............ 200/341 |
| 2010/0213044 A1 | 8/2010 | Strittmatter et al. |
| 2010/0253630 A1* | 10/2010 | Homma et al. ............. 345/168 |
| 2011/0032127 A1 | 2/2011 | Roush |
| 2011/0056817 A1* | 3/2011 | Wu ............................ 200/344 |
| 2011/0056836 A1 | 3/2011 | Tatebe et al. |
| 2011/0203912 A1 | 8/2011 | Niu et al. |
| 2011/0205179 A1 | 8/2011 | Braun |
| 2011/0303521 A1 | 12/2011 | Niu et al. |
| 2012/0012446 A1 | 1/2012 | Hwa |
| 2012/0090973 A1 | 4/2012 | Liu |
| 2012/0098751 A1 | 4/2012 | Liu |
| 2012/0168294 A1 | 7/2012 | Pegg |
| 2012/0193202 A1 | 8/2012 | Chen |
| 2012/0286701 A1 | 11/2012 | Yang et al. |
| 2012/0298496 A1* | 11/2012 | Zhang ......................... 200/5 A |
| 2012/0313856 A1 | 12/2012 | Hsieh |
| 2013/0100030 A1 | 4/2013 | Los et al. |
| 2013/0162450 A1* | 6/2013 | Leong et al. ................. 341/20 |
| 2013/0270090 A1 | 10/2013 | Lee |
| 2014/0071654 A1 | 3/2014 | Chien |
| 2014/0090967 A1 | 4/2014 | Inagaki |
| 2014/0098042 A1 | 4/2014 | Kuo et al. |
| 2014/0116865 A1 | 5/2014 | Leong et al. |
| 2014/0118264 A1 | 5/2014 | Leong et al. |
| 2014/0151211 A1 | 6/2014 | Zhang |
| 2014/0251772 A1 | 9/2014 | Welch et al. |
| 2014/0252881 A1 | 9/2014 | Dinh et al. |
| 2014/0291133 A1* | 10/2014 | Fu et al. ..................... 200/341 |
| 2014/0320436 A1 | 10/2014 | Modarres et al. |
| 2014/0346025 A1 | 11/2014 | Hendren et al. |
| 2014/0375141 A1 | 12/2014 | Nakajima |
| 2015/0016038 A1 | 1/2015 | Niu et al. |
| 2015/0083561 A1* | 3/2015 | Han et al. ................... 200/314 |
| 2015/0090571 A1 | 4/2015 | Leong et al. |
| 2015/0227207 A1 | 8/2015 | Winter et al. |
| 2015/0243457 A1 | 8/2015 | Niu et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0332874 A1 | 11/2015 | Brock et al. |
| 2015/0348726 A1 | 12/2015 | Hendren |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |

FOREIGN PATENT DOCUMENTS

| | | |
|---|---|---|
| CN | 1533128 | 9/2004 |
| CN | 1542497 | 11/2004 |
| CN | 1624842 | 6/2005 |
| CN | 1812030 | 8/2006 |
| CN | 101051569 | 10/2007 |
| CN | 200986871 | 12/2007 |
| CN | 101146137 | 3/2008 |
| CN | 201084602 | 7/2008 |
| CN | 201123174 | 9/2008 |
| CN | 201149829 | 11/2008 |
| CN | 201210457 | 3/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 202008941 | 10/2011 |
| CN | 202040690 | 11/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102629526 | 8/2012 |
| CN | 202372927 | 8/2012 |
| CN | 102683072 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 203733685 | 7/2014 |

(56) References Cited

FOREIGN PATENT DOCUMENTS

| | | |
|---|---|---|
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| DE | 2530176 | 1/1977 |
| DE | 3002772 | 7/1981 |
| DE | 29704100 | 4/1997 |
| EP | 0441993 | 8/1991 |
| EP | 1835272 | 9/2007 |
| EP | 1928008 | 6/2008 |
| EP | 2022606 | 6/2010 |
| EP | 2426688 | 3/2012 |
| EP | 2439760 | 4/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S62072429 | 4/1987 |
| JP | H0422024 | 4/1992 |
| JP | H0520963 | 1/1993 |
| JP | H05342944 | 12/1993 |
| JP | H09204148 | 8/1997 |
| JP | H11194882 | 7/1999 |
| JP | 2000010709 | 1/2000 |
| JP | 2000057871 | 2/2000 |
| JP | 2001100889 | 4/2001 |
| JP | 2002298689 | 10/2002 |
| JP | 2003522998 | 7/2003 |
| JP | 2006164929 | 6/2006 |
| JP | 2006185906 | 7/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2008021428 | 1/2008 |
| JP | 2008041431 | 2/2008 |
| JP | 2008100129 | 5/2008 |
| JP | 2008533559 | 8/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011065126 | 3/2011 |
| JP | 2011150804 | 8/2011 |
| JP | 2011165630 | 8/2011 |
| JP | 2012043705 | 3/2012 |
| JP | 2012063630 | 3/2012 |
| JP | 2012186067 | 9/2012 |
| JP | 2012230256 | 11/2012 |
| JP | 2014017179 | 1/2014 |
| JP | 2014216190 | 11/2014 |
| JP | 2014220039 | 11/2014 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TV | 201246251 | 11/2012 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| WO | WO9744946 | 11/1997 |
| WO | WO2005/057320 | 6/2005 |
| WO | WO2008/045833 | 4/2008 |
| WO | WO2009/005026 | 1/2009 |
| WO | WO2012/027978 | 3/2012 |
| WO | WO2013/096478 | 6/2013 |
| WO | WO2014175446 | 10/2014 |

OTHER PUBLICATIONS

Elekson, "Reliable and Tested Wearable Electronics Embedment Solutions," http://www.wearable.technology/our-technologies, 3 pages, at least as early as Jan. 6, 2016.

* cited by examiner

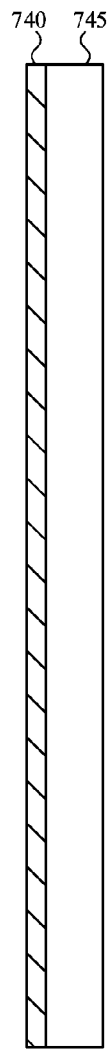 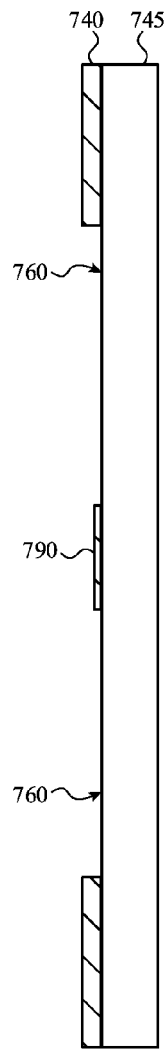 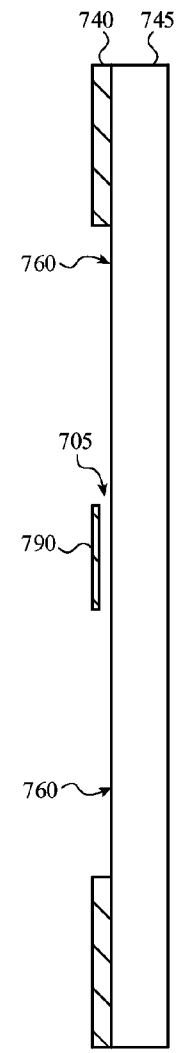 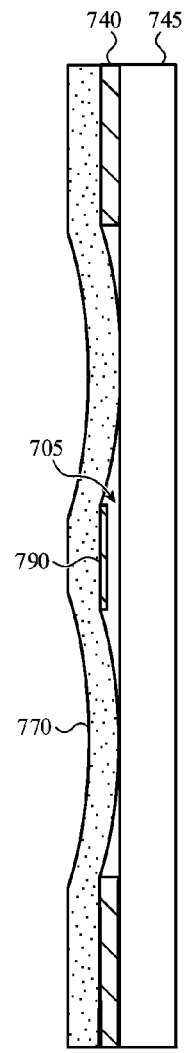
*FIG. 7A*  *FIG. 7B*  *FIG. 7C*  *FIG. 7D*

KEYCAPS WITH REDUCED THICKNESS

CROSS-REFERENCE TO RELATED APPLICATION

This application is a nonprovisional patent application of and claims the benefit to U.S. Provisional Patent Application No. 61/884,241, filed Sep. 30, 2013 and titled "Keycaps Having Improved Illumination and Reduced Thickness," the disclosure of which is hereby incorporated by reference herein in its entirety.

TECHNICAL FIELD

This disclosure relates to input apparatuses for information processing devices and, in particular, to illuminated keycaps for thin profile keyboards.

BACKGROUND

Many electronic devices include input components such as buttons, keyboards, keypads and the like that may include individual buttons or keys that may be selectively illuminated. For example, personal computing devices may include backlit keyboards to enable a user to operate the keyboard in low light conditions. In another example, some electronic devices selectively illuminate keys or buttons for purely aesthetic purposes. Still further electronic devices may selectively illuminate keys or buttons for notification purposes.

Further, demand for illuminated input devices has increased, but at the same time consumers expect input devices to be durable, thin, and light. However, designing an illuminated keyboard, for example, that is durable, thin, illuminable, and light presents several challenges. For example, many keyboards illuminate only select portions of a key cap, such as the legend area, while leaving the remainder of the keycap unilluminated. Accordingly, the material of the legend is often translucent and the remainder of the key material is often substantially opaque.

Often, a translucent keycap is made from injection molded plastic, such as polycarbonate (PC) or acrylonitrile butadiene styrene mixed with a polycarbonate (ABS-PC), and coated in a durable paint. Thereafter, the paint layer is laser cut to reveal a transparent legend. Although inexpensive to manufacture, the luminous quality of a painted backlit key can deteriorate over time with repeated use. Furthermore, in order to be sufficiently durable, a plastic keycap may need to be relatively thick.

Accordingly, there may be a present need for a durable, thin, and illuminated input apparatus.

SUMMARY

Embodiments described herein may relate to or take the form of an illuminated input apparatus such as a keyboard for use with a computing device. The keyboard may include a plurality of keys, each including a metal keycap. The metal keycap may be aluminum, anodized or otherwise finished. The metal keycap may have a top surface including a legend aperture, a legend diffuser material within the legend aperture, a compressible scissor mechanism configured to activate electrical switch circuitry, a light source such as a light emitting diode ("LED") having an on state and an off state, the light source oriented to transmit light through the legend aperture. In one example, the on state may include a legend illumination mode in which the light source transmits light through legend diffuser material and through the legend aperture. In another example, on state may include a keycap perimeter illumination mode in which the light source may emit light proximate perimeter of the metal keycap.

In certain embodiments, the legend aperture may be opened in the metal keycap by a laser cutting, a laser ablation process, or a combination thereof. In certain embodiments, the perimeter of the legend aperture may be defined in part by at least one bridge portion connecting to an island portion, with at least one bridge portion having a thickness less than that of the metal keycap.

In some example embodiments, a portion of the finished or cured legend diffuser material may be coplanar with the top surface of the metal keycap.

Other embodiments described herein may relate to or take the form of a method for manufacturing a light transmissive keycap for illuminating a keyboard, including forming at least a portion of a legend aperture within the metal keycap, depositing a translucent legend diffuser material over the legend aperture, placing the metal keycap and deposited legend diffuser material in a curing condition, smoothing residual legend diffuser material so that the cured legend diffuser material is coplanar with the top surface, which may be flat or arbitrarily curved, smoothing residual legend diffuser material so that the cured legend diffuser material is coplanar to the bottom surface, aligning the metal keycap along a vertical axis with a compressible scissor mechanism positioned above electrical switch circuitry. In further embodiments, the top surface of the keycap need not be flat. For example, the legend diffuser material may be smoothed to follow an arbitrary curvature of the keycap so as to form a substantially continuous surface with the top surface of the keycap. For example, certain keycaps may be slightly convex so as to contour to a typist's finger.

Further embodiments described herein may relate to or take the form of a keyboard including a plurality of keys, each including a keycap including a metal top layer having a uniform thickness, an aperture within the metal top layer defining a legend, a diffuser fill deposited on a bottom surface of the metal top layer, a light emissive layer underlying the plurality of keys, an electrical switch layer including a plurality of electrical switches, each of the plurality underlying a respective one of the plurality of keys.

BRIEF DESCRIPTION OF THE FIGURES

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

FIG. 7A is a close up side view of the keycap shown in FIGS. 4A-4B taken along vertical line 7-7, showing a metal keycap before laser ablation and laser etching.

FIG. 7B is a close up side view of the embodiments shown in FIG. 4A-4B taken along vertical line 7-7, showing the metal keycap after laser ablation and laser cutting.

FIG. 7C is a close up side view of the keycap shown in FIGS. 4A-4B taken along vertical line 7-7, showing the metal keycap inverted and after laser ablation and laser cutting.

FIG. 7D is a close up side view of the keycap shown in FIGS. 4A-4B taken along vertical line 7-7, showing the metal keycap inverted, after laser ablation and cutting and after a legend diffuser material has been applied.

The use of the same or similar reference numerals in different drawings indicates similar, related, or identical items.

DETAILED DESCRIPTION

Figure 1:
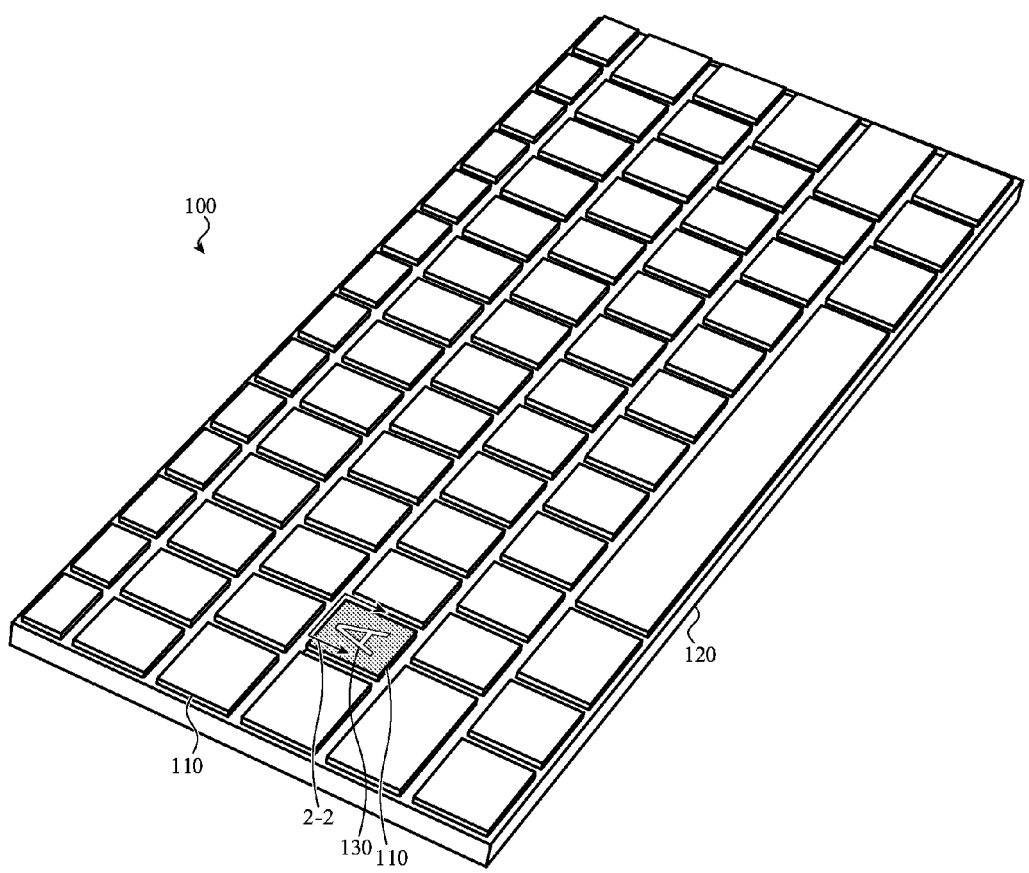
FIG. 1 is a perspective view of a sample embodiment of an illuminated keyboard for use with an electronic device.

Embodiments described herein may relate to or take the form of a backlit input apparatus with an illuminated surface configured to receive user input. In particular, certain embodiments may take the form of a fully or partially illuminated keyboard, keypad, or individual keys having metal keycaps. In certain embodiments, the metal keycap is made from aluminum. Such keys may be used in conjunction with personal computing devices, such as laptop computers or desktop computers, as either integrated or peripheral input devices. Certain other embodiments may take the form of a fully or partially illuminated button with a metal outer surface for use with other electronic devices such as televisions, portable media players, cellular telephones, tablet computers, and the like. Further, although embodiments herein are discussed specifically with respect to metal keycaps, it should be appreciated that alternative embodiments may employ the same structures, operations, methods, apparatuses and the like but incorporate keycaps made from other materials, such as glass, composites, plastics and the like. Accordingly, the discussion is intended to encompass keycaps formed of material other than metal.

One embodiment may be a back-illuminated key associated with a keyboard. The embodiment may include a metal keycap composed principally of aluminum. The metal keycap can have beveled or otherwise polished edges along a planar top surface. The metal keycap may be thin, with a thickness of less than a millimeter. The metal keycap may be anodized or otherwise finished to provide durability and, optionally, a particular look and/or texture.

The metal keycap may include a legend area that can be illuminated. The legend may take the form of any numeral, symbol or letter of any language appropriately suited to the keyboard. For example, the legend may be one or more English letters or symbols in one embodiment, or the legend may be one or more simplified Chinese characters. In further embodiments, the legend may take the form of a function symbol such as a power symbol, an eject symbol, or a play/pause symbol. One may appreciate that a legend may include any symbol, character, glyph, letter, artwork or other information-conveying image.

The legend may include one or more counters. A "counter" is an enclosed negative space within the perimeter of a glyph. For example, glyphs of the English letters "W" or "T" do not contain any counters, while a glyph of the English letter "B" contains two counters and a glyph of the letter "Q" contains one counter. The number, size, orientation, and location of counters may depend on the style of the legend itself. For example, for certain glyph designs (corresponding to particular fonts), the Arabic numeral "4" may have a counter while for other glyph designs, it may not. Accordingly, one may appreciate that the presence or absence of a counter or multiple counters for particular legends may vary from embodiment to embodiment.

In many embodiments, the legend may be cut from, cut into, or cut through the metal keycap in a laser cutting process, a laser ablation process, or any sequential or simultaneous combination thereof. In alternate embodiments, a metal stamping process, a mask and immerse chemical etching process, or any other suitable process or combination of processes may be used.

Laser cutting may involve directing a focused beam of light at a surface of the metal keycap. The material of the metal keycap may be melted, burned, ablated, or otherwise vaporized as a result. The heated material may be blown free by a gas or liquid jet or may be vaporized. One may appreciate that the focal point of the laser may be set along the top surface of the metal keycap or the bottom surface of the metal keycap, or anywhere in between. In a further embodiment, a portion of the legend may be cut from the top surface and a second portion may be cut from the bottom surface.

Laser ablation may involve a pulsed or continuous laser focused on the surface of the metal keycap in order to remove material from the metal keycap in a controlled manner without cutting entirely through the surface of the metal keycap.

In an embodiment featuring a legend without a counter, laser cutting of the metal keycap may be sufficient to cut the legend through the top surface and back surface of the metal keycap, opening an aperture in the metal keycap in the shape of the desired glyph.

In another embodiment featuring a legend with one or more counters, laser cutting of the metal keycap may remove both the exterior perimeter of the glyph as well as the one or more counters. In one embodiment, the separated counters may be collected to be attached to the metal keycap in a later process.

In a further embodiment featuring a legend having one or more counters, a combination of laser cutting and laser ablation may be used. A laser cutting process may be used to cut a substantial portion of a legend, leaving behind a select amount of material connecting the one or more counters to the outer perimeter of the legend such that the counter is held in place. In such an embodiment, the remaining counters may be referred to as "islands" and may be retained in position by one or more bridges. One may appreciate that any number of islands or any number of bridges may be required or desired depending upon the shape of the legend and the number or size of counter portions. Further, the location, width, orientation, and geometry of individual bridges may differ from embodiment to embodiment.

In a supplemental or additional process, laser ablation may be used to reduce the depth of the one or more bridges. In a first embodiment, the one or more bridges may be ablated from the top surface of the metal keycap. By ablating a portion of the depth of the bridges, the cross-section of the legend that intersects the top surface of the metal keycap may be uninterrupted by bridges, as described in further detail below.

After a legend or aperture has been cut into the top surface of the metal keycap, a legend diffuser material may be applied to fill the volume defined by the legend within the metal keycap. In a first example embodiment, the metal keycap may be inverted and placed along a flat processing surface. Next, the legend diffuser material may be applied as a liquid to the back of the metal keycap. The legend diffuser material may be composed of a semi-transparent or translucent material that is doped with glass beads or another diffusion dopant. In certain embodiments, the legend diffuser material may also include a pigment or ink of a particular color. For example, in certain embodiments, titanium oxide powder may be used to make the legend diffuser material, and thus optionally at least part of the keycap white. The white color may be seen only when light is transmitted therethrough or may be generally visible even when the keycap is not illuminated.

During the application of the legend diffuser material to the keycap, pockets of air may remain within the legend volume. For example, such pockets may be trapped by the application of the legend diffuser material. In other cases, unwanted pockets of air may remain within the volume defined by the ablated bridges and the flat processing surface. In order to remove the unwanted pockets of air such that the legend diffuser material occupies the entire volume defined by the legend and ablated bridges, the metal keycap with legend and legend diffuser may be placed in a vacuum chamber such that differential pressure between the pockets and the vacuum cause the removal of the air pockets. In another embodiment, the metal keycap and legend diffuser may be placed within an autoclave or other high pressure chamber to facilitate a pressure differential to remove the air pockets. In a subsequent process, the metal keycap and legend diffuser may be cured so that the legend diffuser material may harden and/or adhere to the metal keycap in a substantially permanent fashion. Curing conditions may differ depending on the material selected for the legend diffuser, the material selected for the dopant or pigment, and/or other factors. For example, curing conditions may include exposure to ultraviolet light of a particular wavelength, exposure to heat, or exposure to pressure.

After curing, the legend diffuser material may be smoothed or polished to a plane in a subsequent process such that an outer surface of the legend diffuser material is substantially parallel with the top surface of the metal keycap. Once polished, the metal keycap may be attached to a sub-frame which may include a scissor mechanism or other button mechanism positioned to activate electrical switch circuitry when depressed. In certain embodiments, the legend diffuser material may be polished such that the outer surface of the layer is coplanar with the bottom of the metal keycap. In other examples, the legend diffuser material may be polished such that the outer surface of the layer forms a substantially continuous surface with the bottom of the metal keycap.

For example, the legend diffuser material may be smoothed to follow an arbitrary curvature of the keycap so as to form a substantially continuous surface with the top surface of the keycap. In other embodiments, the legend diffuser material may be polished such that the outer surface of the layer is parallel to, but separated by, a gap or spacer from the bottom surface of the metal keycap. In further embodiments, the top surface of the legend diffuser material may be polished or otherwise finished so that it is substantially coplanar with the top surface of the metal keycap. In other examples, the top surface of the legend diffuser material may be polished or otherwise finished such that the outer surface of the material forms a substantially continuous surface with the bottom of the metal keycap.

In further embodiments, a legend diffuser material may not necessarily be separately applied to the laser cut metal keycap. For example, a laser cut metal keycap may be placed adjacent or on a top surface of a plastic carrier. Thereafter, the assembly may be placed into a reflow oven such that the plastic material from the plastic carrier melts and flows into the void defined by the laser cuts within the metal keycap. In other embodiments, other mechanisms for in-flowing plastic into the void defined by the laser cuts within the metal keycap.

Included within, below or adjacent a keycap may be one or more light sources positioned to emit light through the legend of the metal keycap. In certain embodiments, the light source may include or be coupled to a light source such as an organic light-emitting diode ("OLED"), a semiconductor-based light-emitting diode ("LED") or any other suitable light source. In a first embodiment, the light source may be positioned to transmit light through the legend diffuser material. Thus, when viewing the metal keycap from above, the legend may be illuminated from its backside, such that light shines through the legend.

In a further embodiment, the light source may be positioned to transmit light around the perimeter of the metal keycap. In this way, when viewing the metal keycap from above, the perimeter of the key may appear illuminated. As one example, the metal keycap may appear to have a halo surrounding its periphery.

FIG. 1 is a perspective view of a sample embodiment of an illuminated keyboard 100 for use with an electronic device. The keyboard 100 may be a peripheral component of a desktop computing system or, in other embodiments, it may be an integral portion of a laptop computing system. The keyboard 100 may have one or more keys 110 and a housing 120 that fully or partially encases the internal components of the keyboard 100. In certain embodiments, the keyboard 100 may have a greater number of keys 110, or a fewer number of keys 110 than illustrated. The keys may be arranged in a different order. Some or all of the one or more keys 110 may have a legend image 130 associated with it. As illustrated, the one or more keys 110 may be of different sizes and may be positioned at different locations along the surface of the keyboard 100.

Figure 2:
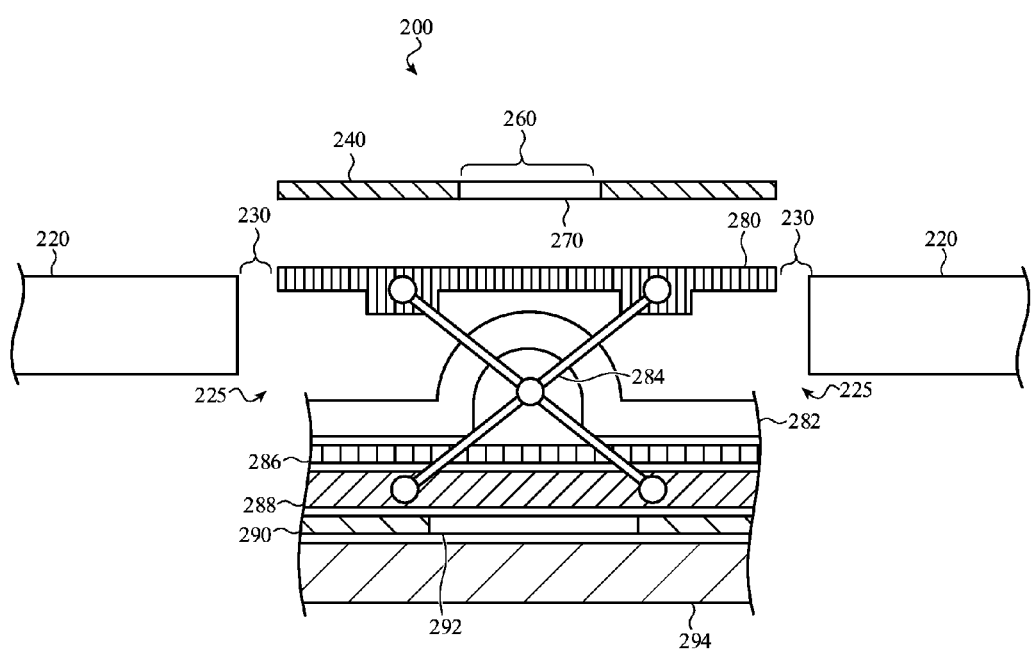
FIG. 2 is a close-up and exploded side cross-sectional view of a keycap of an embodiment of the illuminated keyboard taken along line 2-2 of FIG. 1.

FIG. 2 is a close-up and exploded side cross-sectional view, taken along line 2-2 of FIG. 1, of a key 200 of the illuminated keyboard 100. The key 200 may be positioned at least partially within the housing 220 of the keyboard 100 (not shown). Through the housing 220 may be defined a key aperture 225, which may be present on both sides of the cross section and as illustrated. The key aperture 225 may be sized such that a perimeter gap 230 is present between the key 200 and the housing 220. The perimeter gap 230 may be selectively sized based on the size of the key 200. In certain embodiments, the key aperture 225 may not be necessarily required. Instead, one or more keys 110 (not shown in FIG. 2) may be arranged substantially adjacent to one another such that the perimeter gap 230 of each key is defined by the keys neighbor to the key 200.

The term "horizontal" as used herein, except as otherwise noted, is defined as lying within the plane parallel to the surface of the housing 120 and 220 of the keyboard 100. The term "vertical" as used herein, except as otherwise noted, is defined as a direction perpendicular to the horizontal plane. Similar directional terminology as used herein (e.g., "above" or "below" or "top" or "bottom") is defined with respect to the horizontal plane.

The key 200 may have a metal keycap 240. In certain embodiments, the metal keycap 240 may be composed of silica metal, sapphire metal, or another similar substantially transparent and scratch resilient material. The metal keycap 240 may include a substantially flat top surface. In certain embodiments, the metal keycap 240 may have a slightly concave shape so as to enhance the feel of the key when depressed by a user.

Disposed within the metal keycap 240 may be a legend aperture 260. Although shown in cross section, one may appreciate that the legend aperture 260 may, when viewed from above, take the form of any numeral, legend or letter of any language appropriately suited to the keyboard 100, or any symbol, icon or graphic that conveys information. For example, the legend aperture 260 may take the form of one or more English letters or, in another embodiment, the legend may take the form of the one or more simplified Chinese characters.

The legend aperture 260 may be formed from a diffuser material 270. In certain embodiments, the legend diffuser material 270 may be doped with a pigment of a particular color. For example, titanium oxide which may give the legend diffuser material 270 a white appearance. The legend diffuser material 270 may fill the legend aperture 260 from the top surface of the metal keycap 240 to the bottom surface of the metal keycap 240. In this way, the legend diffuser material 270 may occupy the volume of the legend aperture 260 within the background metal keycap 240.

Below the diffuser layer 270 may be a vertically compressible layered support structure positioned to activate electrical switch circuitry when depressed. A first layer of the structure may be a metal keycap receiving pad 280. The metal keycap receiving pad 280 may have a substantially flat top surface so that it may be adhered or attached to the bottom surface of the legend diffuser material 270 and to the bottom surface of the metal keycap 240, although in some embodiments this receiving pad may be omitted.

Disposed below the metal keycap receiving pad 280 may be a membrane 282, such as a dome switch. The membrane 282 may be constructed of a deformable polymer material such as rubber or silicon and may include one or more electrical contacts, although these contacts have been omitted from FIG. 2 for purposes of simplicity. The material selected for the membrane 282 may be substantially transparent in some embodiments.

Adjacent to the membrane 282 may be a compressible scissor mechanism 284 which collapses when the metal keycap 240 is depressed by the user. Collapsing the keycap may also collapse the dome switch or any other membrane beneath the keycap.

Below the membrane 282 may be a first contact wiring layer 286. Electrical contacts (not shown) may be disposed on the top surface of the first contact wiring layer 286 such that, when the membrane 282 and the compressible scissor mechanism 284 compress beyond a certain point, the electrical contacts of the membrane 282 and the electrical contacts of the first contact wiring layer 286 complete an electrical circuit. This may initiate a signal indicating that the key 200 has been depressed by the user.

In some embodiments, the first contact wiring layer 286 may be disposed upon a first substrate layer 288 which provides structural support to the key 200. The substrate layer 288 may be composed of a transparent or substantially transparent material. Below the substrate layer 288 may be an illumination layer 290 including a light emitting element 292 which is centered below the metal keycap 240. The light emitting element 292 may be an LED, OLED, or any other suitable light source. Although shown as a single light source, one may appreciate that multiple light sources may be used. For example, a light emitting element 292 may be positioned on the illumination layer 290 so as to direct or transmit light through the perimeter gap 230. In this manner, the light emitting element 292 may illuminate the perimeter of the key 200, creating a halo effect about the key 200 when viewed from above.

In another embodiment, a light emitting element 292 may be positioned to direct light only through the legend aperture 260. In this manner, the light emitting element 292 may illuminate the legend aperture 260, creating an illuminated legend effect on the surface of the key 200 when viewed from above.

One may further appreciate that a plurality of light emitting elements 292 may be disposed upon or within the light emissive layer 290. In this manner, multiple portions of the key 200 may be selectively or jointly illuminated.

It should be appreciated that light-emitting elements may be located substantially anywhere with respect to the layers and elements shown in FIG. 2. For example, a light-emitting element may be located between the membrane and the keycap or keycap receiving pad. As another example, a light pipe or other light-transmitting structure may be at least partially embedded in the housing 220 of the keyboard 100, such that light is transmitted through the light pipe and illuminates the legend.

Below the optional light emissive layer 290 may be disposed a second substrate layer 294, providing structural support to the key 200.

One may appreciate that FIG. 2 is not drawn to scale. For clarity, the relative height of each illustrated item has in some cases been substantially exaggerated to show the relationship between each of the several layers forming key 200. For example, one may appreciate that the metal keycap 240 may be less than a millimeter in height.

Figure 3A:
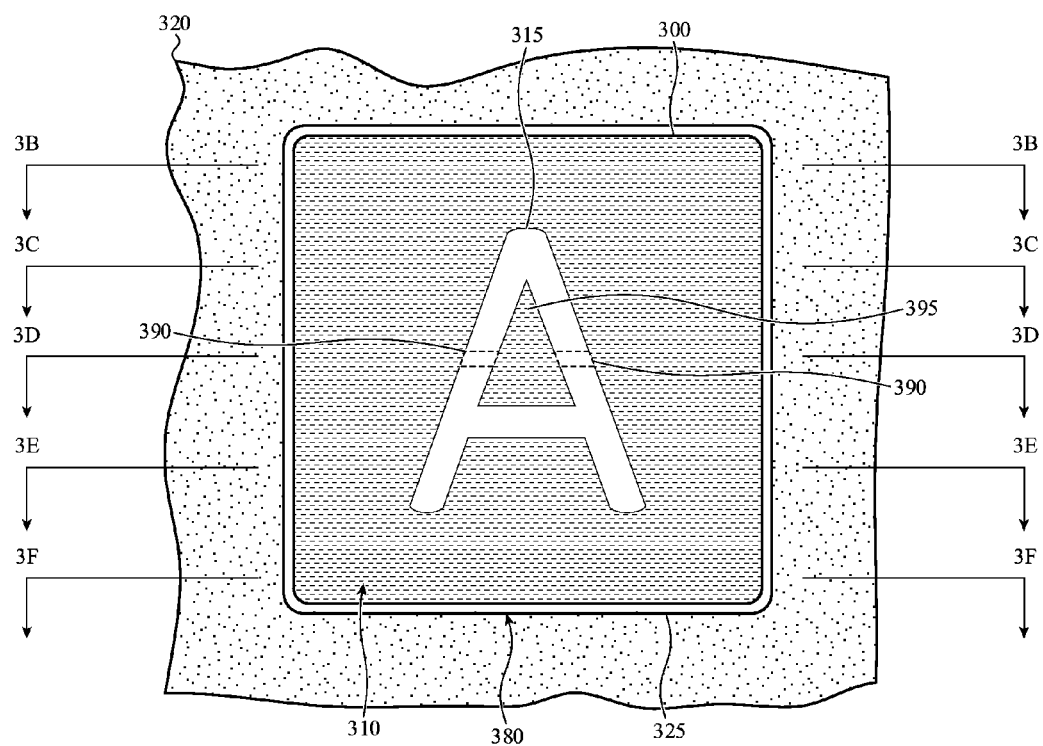
FIG. 3A is a top plan view of a keycap showing a legend as a portion of the embodiment as shown in FIG. 1.

FIG. 3A is a top plan view of a metal keycap 300 showing a legend as a portion of the embodiment as shown in FIG. 1. The metal keycap may include at least background area 310 and a legend area 315, which as illustrated shows the English letter "A." The metal keycap 300 may be situated within the housing 320 of a keyboard 100 (see, for example, FIG. 1). The metal keycap 300 may be positioned within a key aperture 325 defined within the keyboard. The horizontal surface area of the key aperture 325 may be slightly larger than the horizontal surface area of the metal keycap 300 such that a keycap perimeter gap 380 is formed.

Also shown in FIG. 3A are two bridge portions 390 and an island portion 395. The bridge portions 390 are shown in dotted lines to indicate the hidden geometry. One may appreciate that from the top view shown in FIG. 3A, the bridge portions are not visible.

FIGS. 3B-3F are close up side views of the embodiment shown in FIG. 3A taken along cross sections 3B-3F respectively. Visible in all cross sections shown in FIGS. 3B-3F is the metal keycap 340. The metal keycap 340 sits within the key aperture (not shown) within the keyboard housing 320 exposing the perimeter gap 330. As noted with respect to the embodiment illustrated by FIG. 2, the metal keycap 340 may be composed of metal.

Line 3B-3B of FIG. 3A does not intersect any portion of the legend area 315 of FIG. 3A. Accordingly, in the cross-section shown in FIG. 3B, no portion of a legend is present or illustrated.

Line 3C-3C of FIG. 3A intersects a portion of the legend area 315 of FIG. 3A. Specifically, line 3C-3C intersects the crest of the "A" legend as illustrated in FIG. 3A. Accordingly, within the cross section shown in FIG. 3C, a portion of a legend area 315 is shown. Because line 3C-3C intersects the legend only once, FIG. 3C illustrates only a single portion of the legend area 315.

Figure 3B:
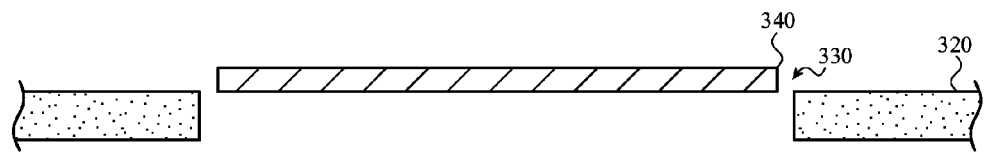
FIG. 3B is a close up side view of the embodiment shown in FIG. 3A taken along line 3B-3B.
Figure 3C:
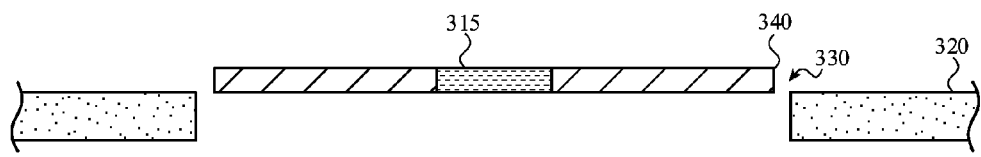
FIG. 3C is a close up side view of the embodiment shown in FIG. 3A taken along line 3C-3C.
Figure 3D:
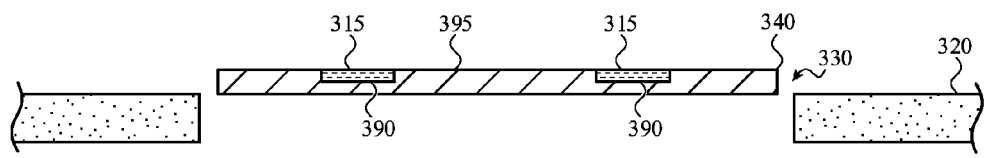
FIG. 3D is a close up side view of the embodiment shown in FIG. 3A taken along line 3D-3D.
Figure 3E:
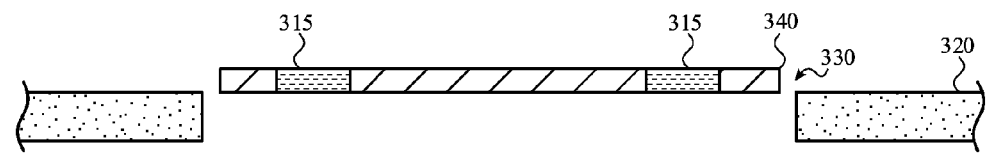
FIG. 3E is a close up side view of the embodiment shown in FIG. 3A taken along line 3E-3E.

FIG. 3D is a cross section of line 3D-3D of FIG. 3A intersects a portion of the legend area 315, and a portion of the island 395 and bridge areas 390 of FIG. 3A. The bridge sections 390 extend to connect the outer portions of the keycap 340 to the island portion 390. As illustrated, the bridge sections 390 have a smaller thickness than the rest of the metal keycap 340.

Line 3E-3E of FIG. 3A intersects a portion of the legend area 315 of FIG. 3A. Specifically, line 3E-3E intersects the extended leg portions of the "A" legend as illustrated in FIG. 3A. Accordingly, within the cross section shown in FIG. 3C, a portion of a legend area 315 is shown. Because line 3E-3E intersects the legend twice, FIG. 3C illustrates two portions of the legend area 315.

Figure 3F:
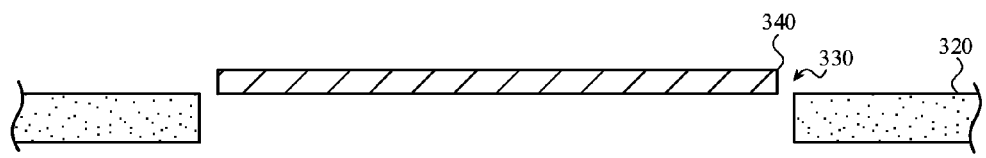
FIG. 3F is a close up side view of the embodiment shown in FIG. 3A taken along line 3F-3F.

Similar to FIG. 3B, FIG. 3F does not intersect any portion of the legend area 315 of FIG. 3A and accordingly, no portion of a legend is present or illustrated.

Figure 4A:
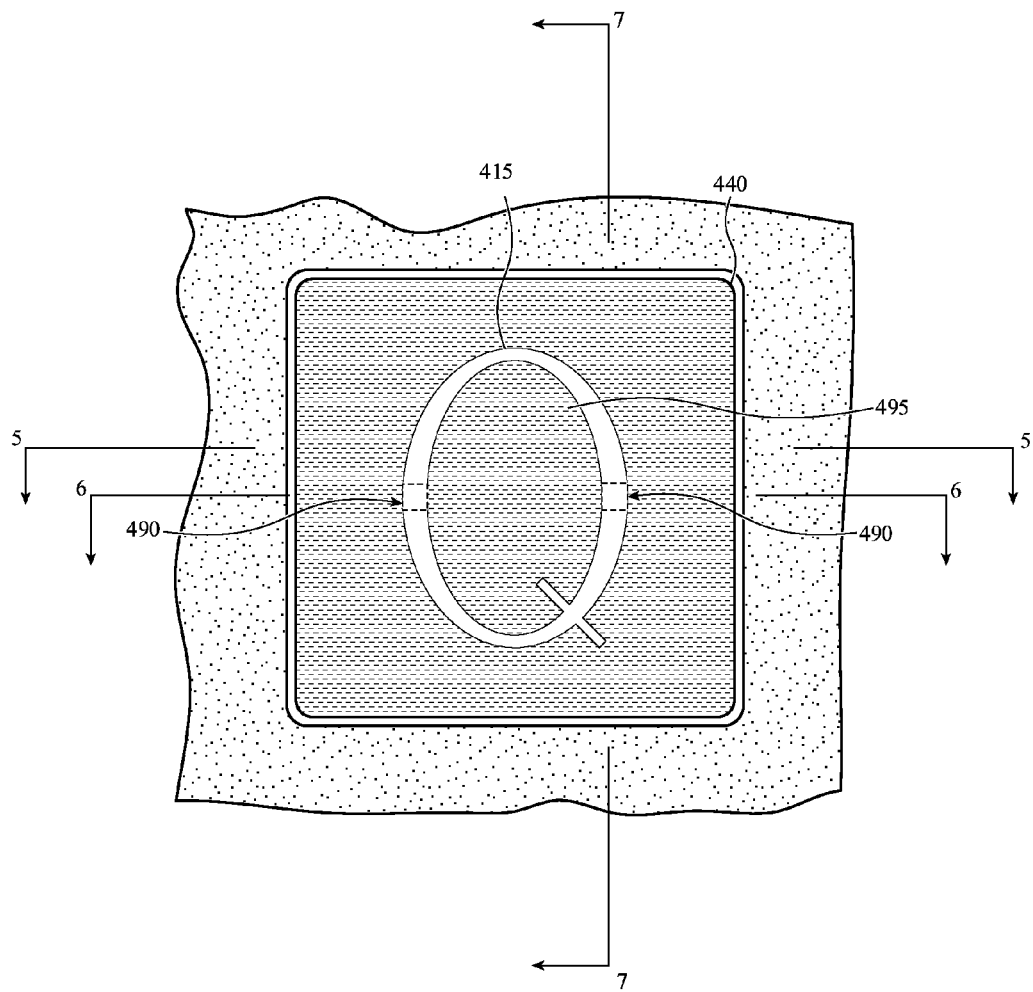
FIG. 4A is a top plan view of another keycap, showing a hidden geometry of bridges supporting a central island portion.

FIG. 4A is a top plan view of a keycap showing hidden geometry of bridges supporting a central island portion. Illustrated in FIG. 4A is a legend area 415 within a metal keycap 440. The legend area 415 is shown as a glyph of the English letter "Q." As previously noted, the English letter Q includes a single counter as an enclosed island defined within the exterior perimeter of the letter. The counter may be identified as an island 495. The island 495 may be connected to the metal keycap 440 by one or more bridges 490. The one or more bridges 490 are shown as hidden geometry from the top view as shown in FIG. 4A.

Figure 4B:
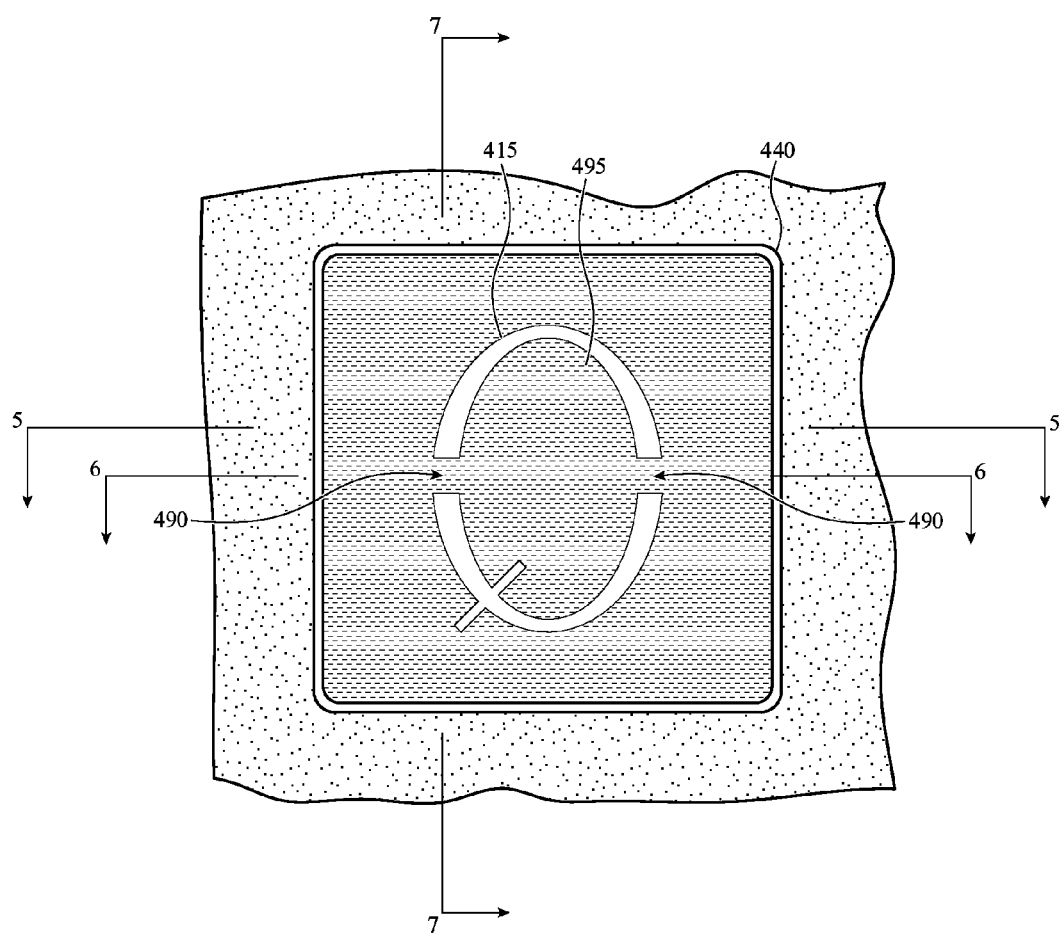
FIG. 4B is a bottom plan view of the keycap of FIG. 4A, showing the geometry of bridges supporting a central island portion.

FIG. 4B is a bottom plan view of a keycap as shown in FIG. 4A showing a geometry of bridges supporting a central island portion. Illustrated in FIG. 4B is a legend area 415 within a metal keycap 440. The legend area 415 is shown as a glyph of the English letter "Q" flipped along the midsection. One may appreciate that the legend inverts from the bottom view of the keycap 440. Visible in FIG. 4B is an island 495, connected to the metal keycap 440 by one or more bridges 490. Of note is that the bridge portions are visible from the bottom view of the metal keycap 440.

With respect to FIGS. 5A-5F, the term "horizontal" is defined as the plane parallel to the surface of the metal keycap unless as otherwise noted with respect to individual figures. The term "vertical" as with respect to FIGS. 4A-4D is defined as the direction perpendicular to the horizontal plane, unless as otherwise noted with respect to individual figures. Similar directional terminology as used herein (e.g., "above" or "below" or "on" or "under") is defined with respect to the horizontal plane.

The creation of a legend, including optional bridges, islands, and the like, will now be discussed.

Figure 5A:
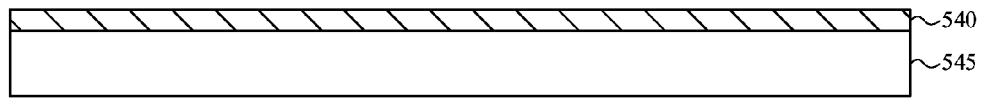
FIG. 5A is a close up side view of the keycap shown in FIGS. 4A-4B taken along horizontal line 5-5, showing an inverted metal keycap before laser cutting.

FIG. 5A is a close up side view of the embodiments shown in FIG. 4A-4B taken along horizontal line 5-5, showing a metal keycap 540 before laser cutting. Below the metal keycap 540 is positioned a processing surface 545. The processing surface 545 may be the bed of a laser cutting or ablation apparatus, as one example, or another substrate supporting the key. In certain embodiments, the processing surface may be composed of metal, ceramic or other materials. It should be appreciated that the processing surface may be omitted in some embodiments and the key may be held or otherwise suspended instead.

Figure 5B:
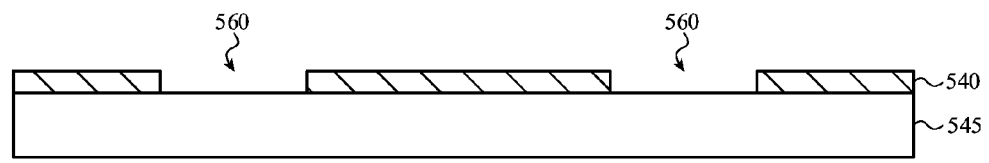
FIG. 5B is a close up side view of the keycap shown in FIGS. 4A-4B taken along horizontal line 5-5, showing the inverted metal keycap after laser cutting.

FIG. 5B is a close up side view of the embodiments shown in FIG. 4A-4B taken along horizontal line 5-5, showing the metal keycap after laser cutting. The void areas (e.g., legend apertures 560) may be exposed by the laser cutting process. In other embodiments, the legend apertures 560 may be cut via a masking and chemical etching process. For example, a mask may be applied over the metal keycap 540. The mask may cover portions of the metal keycap 540 that should remain after etching, but may expose all portions of the metal keycap 540 that should be removed in order to expose the legend apertures 560. After the mask is applied, the metal keycap 540 may be immersed in, or exposed to, an etching solution that dissolves or otherwise reacts with the material selected for the metal keycap 540 but not the material selected for the mask. After a proscribed period of time, the metal keycap 540 may be removed from the etching solution and the mask may be removed.

Figure 5C:
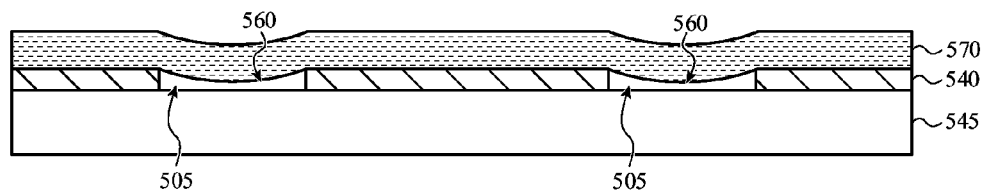
FIG. 5C is a close up side view of the keycap shown in FIGS. 4A-4B taken along horizontal line 5-5, showing the inverted metal keycap after laser cutting and after a layer of legend diffuser material is applied.

FIG. 5C is a close up side view of the embodiment shown in FIG. 5B showing a sample cross section of a metal keycap 540 after a legend diffuser material 570 is applied over the metal keycap 540 and the exposed portions of a legend aperture 560. In certain embodiments, during the application of the legend diffuser material 570, unwanted pockets of air 505 may remain within the legend 560. The unwanted pockets of air 505 may cause undesirable visual artifacts in the legend.

In order to remove the unwanted pockets of air 505, the metal keycap 540 and legend diffuser material 570 may be placed in a vacuum chamber (not shown) such that a negative pressure differential forms to eliminate the air pockets 505. One may appreciate that the air pockets 505 may be created at or near atmospheric pressure. Accordingly, when placed in a vacuum environment, the difference in pressure between the air pockets 505 and the exterior vacuum may equalize, which may pull the diffuser layer 570 to fill the entire volume of the legend aperture 560, as shown in FIG. 5D.

In another embodiment, the metal keycap 540 and legend diffuser material 570 may be placed within an autoclave or other high pressure chamber to facilitate a positive pressure differential to remove the air pockets 505. As noted above, the air pockets 505 may be created at or near atmospheric pressure. When placed in a high pressure environment, the difference in pressure may push the diffuser layer 570 to fill the entire volume of the legend 560, as shown in FIG. 5D.

Figure 5D:
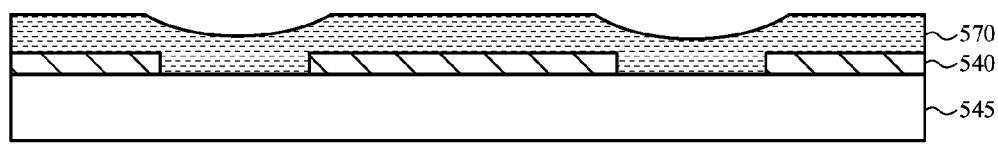
FIG. 5D is a close up side view of the keycap shown in FIGS. 4A-4B taken along horizontal line 5-5, showing the inverted metal keycap with legend diffuser material drawn in to occupy the volume opened by laser cutting.
Figure 5E:
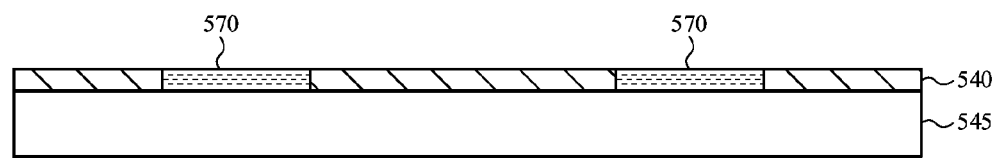
FIG. 5E is a close up side view of the keycap shown in FIGS. 4A-4B taken along horizontal line 5-5, showing a legend diffuser material finished to be substantially coplanar with a bottom surface of the inverted metal keycap.
Figure 5F:
FIG. 5F is a close up side view of the keycap shown in FIGS. 4A-4B taken along horizontal line 5-5, showing the metal keycap after a legend diffuser material has been applied, cured and finished.

FIG. 5E is a close up side view of the embodiment shown in FIG. 5D showing a sample cross section of a keycap 540 with the legend diffuser material 570 finished to a smooth plane, coplanar with the top surface of the metal keycap 540. In certain embodiments, smoothing the legend diffuser material in this manner may provide for an exceptionally thin overall keycap thickness. In other embodiments, the legend diffuser material 570 can be finished to a smooth surface that forms a substantially continuous surface with the top surface of the metal keycap 540. For example, the top surface of the metal keycap 540 may be partially convex so as to contour to a typist's finger.

Once polished or otherwise smoothed, the keycap may be removed from the processing surface, vertically flipped, and attached to a key stack, such as some of or the entire stack shown in FIG. 2. The legend diffuser material 570 may be smoothed in order to provide the substantially parallel relationship between the scissor mechanism and the top surface of the metal keycap 540 in the illustrated embodiment.

Figure 6A:
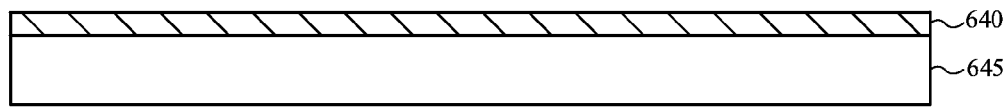
FIG. 6A is a close up side view of the keycap shown in FIGS. 4A-4B taken along horizontal line 6-6, showing a metal keycap before laser ablation.

FIG. 6A is a close up side view of the embodiments shown in FIG. 4A-4B taken along horizontal line 6-6, showing a metal keycap 640 before laser ablation. Below the metal keycap 640 is positioned a processing surface 645. In certain embodiments, the processing surface may be composed of metal, ceramic or other materials.

Figure 6B:
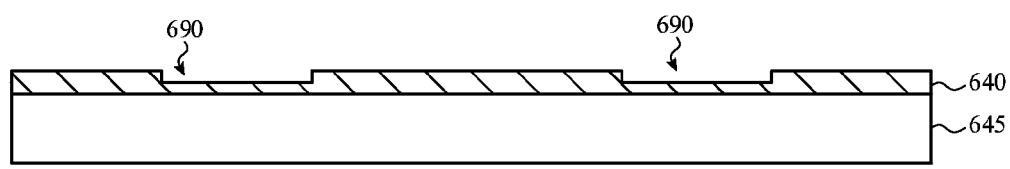
FIG. 6B is a close up side view of the keycap shown in FIGS. 4A-4B taken along horizontal line 6-6, showing the metal keycap after laser ablation.

FIG. 6B is a close up side view of the embodiments shown in FIG. 4A-4B taken along horizontal line 6-6, showing the metal keycap after laser ablation. The reduced areas, or the bridges 690 may be exposed by a laser ablation process. Laser ablation may involve a pulsed or continuous laser focused on the surface of the metal keycap 640 in order to remove material from the metal keycap in a controlled manner without cutting entirely through the surface of the metal keycap. The bridges 690 may be reduced to a certain selected depth.

In other embodiments, the bridges 690 may be etched via a masking and chemical etching process, similar to that previously described.

Figure 6C:
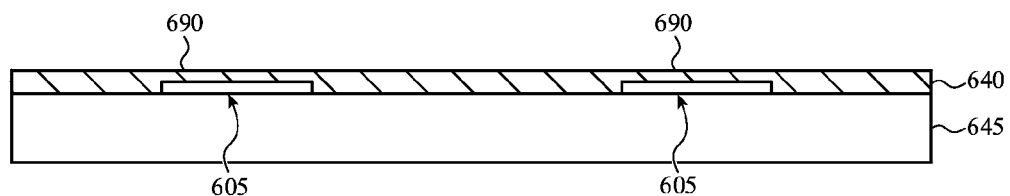
FIG. 6C is a close up side view of the keycap shown in FIGS. 4A-4B taken along horizontal line 6-6, showing the metal keycap after laser ablation and inverted from the view of FIG. 6B.

FIG. 6C is a close up side view of the embodiments shown in FIG. 4A-4B taken along horizontal line 6-6, showing the inverted metal keycap 640 after laser ablation. The metal keycap 640 may be inverted by any suitable process. The metal keycap 640 may be inverted so that, when a legend diffuser material 670 (not shown in FIG. 6C) is applied, a portion of the legend diffuser material 670 which interfaces with a top surface of the processing surface 645 may cure to the shape of the processing surface 645. For example, in the embodiment illustrated, the legend diffuser material may enjoy a flat surface.

As a result of the inversion, unwanted or undesirable pockets of air 605 may remain within the volume defined by the processing surface 645 and the bridges 690. The unwanted pockets of air 605 may cause undesirable visual artifacts in the legend. In further embodiments, pockets of air 605 may be desirable for diffusion or other optical or structural characteristics. In such an embodiment, the pockets of air 605 need not be removed prior to curing.

For embodiments in which unwanted pockets of air 605 should be removed, the metal keycap 640 and legend diffuser material 670 (not shown) may be placed in a vacuum chamber (not shown) such that a negative pressure differential forms to eliminate the air pockets 605. One may appreciate that the air pockets 605 may be created at or near atmospheric pressure. Accordingly, when placed in a vacuum environment, the difference in pressure between the air pockets 605 and the exterior vacuum may equalize, which may pull the diffuser layer 670 to fill the entire volume defined by the processing surface 645 and the bridges 690, as shown in FIG. 6E.

In another embodiment, the metal keycap 640 and legend diffuser material 670 may be placed within an autoclave or other high pressure chamber to facilitate a positive pressure differential to remove the air pockets 605. As noted above, the air pockets 605 may be created at or near atmospheric pressure. When placed in a high pressure environment, the difference in pressure may push the diffuser layer 670 to fill volume the defined by the processing surface 645 and the bridges 690, as shown in FIG. 6D.

Figure 6D:
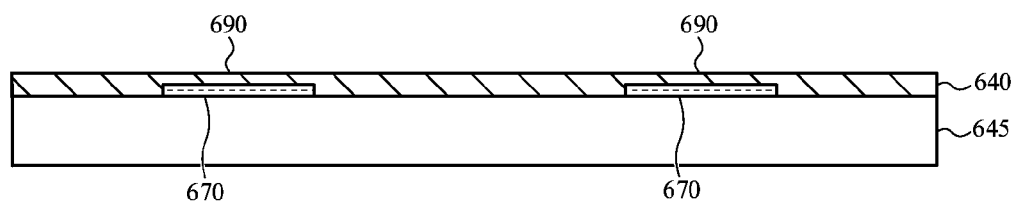
FIG. 6D is a close up side view of the keycap shown in FIGS. 4A-4B taken along horizontal line 6-6, showing the metal keycap after laser ablation, inverted, and after a legend diffuser material has been applied and drawn into the volume defined by the laser ablation.
Figure 6E:
FIG. 6E is a close up side view of the keycap shown in FIGS. 4A-4B taken along horizontal line 6-6, showing the metal keycap after legend diffuser material has been applied, cured and finished.

FIG. 6E is an close up side view of the embodiment shown in FIG. 6D showing a sample cross section of a keycap 640 with the legend diffuser material 670 finished to a smooth plane, coplanar with the top surface of the metal keycap 640. As noted with respect to other embodiments described here, the legend diffuser material 670 may be alternately or additionally finished to form a substantially continuous surface with the top surface of the keycap 670. In certain embodiments, smoothing the legend diffuser material in this manner may provide for an exceptionally thin overall keycap thickness.

Once polished or otherwise smoothed, the keycap may be removed from the processing surface, vertically flipped, and attached to a scissor mechanism (not shown) or other button mechanism positioned to activate electrical switch circuitry when depressed. The legend diffuser material 670 may be smoothed in order to provide a substantially parallel relationship between the scissor mechanism and the top surface of the metal keycap 640.

Figure 7E:
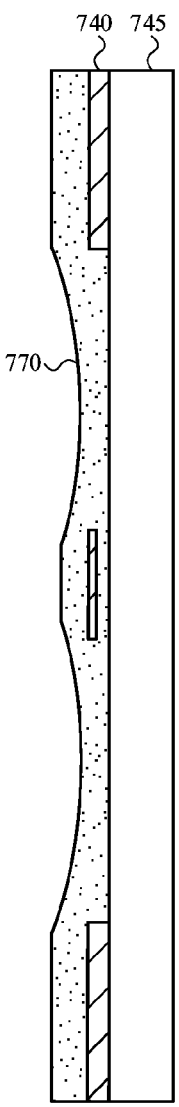
FIG. 7E is a close up side view of the keycap shown in FIGS. 4A-4B taken along vertical line 7-7, showing the metal keycap inverted, after laser ablation and cutting and after a legend diffuser material has been applied and drawn into the volume defined by the laser ablation and laser cut.

FIG. 7A is a close up side view of the embodiments shown in FIG. 4A-4B taken along vertical line 7-7, showing a metal keycap 740 atop a processing surface 745, before laser ablation or laser cutting.

FIG. 7B is a close up side view of the embodiments shown in FIG. 4A-4B taken along vertical line 7-7, showing the metal keycap 740 after laser ablation and laser cutting. Opened within the metal keycap 740 is a legend aperture 760. As with FIGS. 5A-5H, the legend aperture 760 may be opened in the metal keycap 740 in a laser cutting process. Also shown is a vertical cross section of a bridge portion 790, which may be formed by a laser ablation process.

FIG. 7C is a close up side view of the embodiments shown in FIG. 4A-4B taken along vertical line 7-7, showing the inverted metal keycap 740 after laser ablation and laser cutting. As described with respect to FIG. 7B, a result of the inversion may be that unwanted pockets of air 705 remain within the volume defined by the processing surface 745 and the bridge 790. The unwanted pockets of air 705 may cause undesirable visual artifacts in the legend.

FIG. 7D is a close up side view of the embodiments shown in FIG. 4A-4B taken along vertical line 7-7, showing the inverted metal keycap 740 after laser ablation and cutting and after a legend diffuser material 770 has been applied. As with embodiments described above, in order to remove the unwanted pockets of air 705, the metal keycap 740 and legend diffuser material 770 may be placed in a vacuum chamber (not shown) such that a negative pressure differential forms to eliminate the air pockets 705.

Figure 7F:
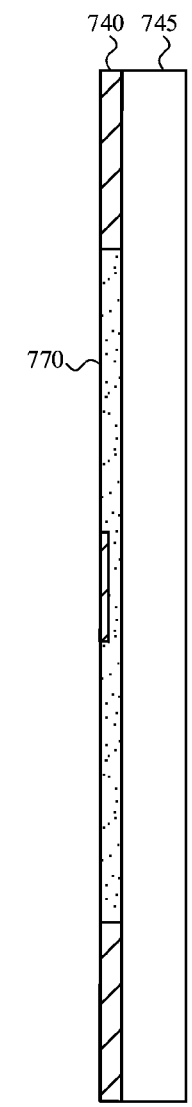
FIG. 7F is a close up side view of the keycap shown in FIGS. 4A-4B taken along vertical line 7-7, showing the metal keycap after legend diffuser material has been applied, cured and finished.
Figure 7G:
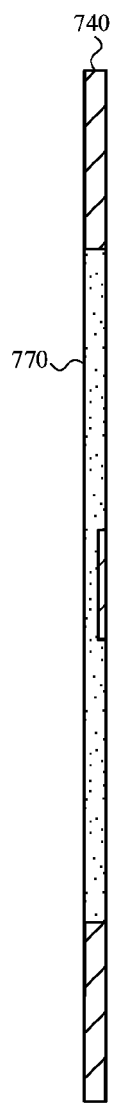
FIG. 7G is a close up side view of the keycap shown in FIGS. 4A-4B taken along vertical line 7-7, showing the metal keycap removed from a processing surface.

FIG. 7F is a close up side view of the embodiments shown in FIG. 4A-4B taken along vertical line 7-7, showing the metal keycap 740 after legend diffuser material has been applied, cured and finished. FIG. 7G illustrates the metal keycap 740 after removal from the processing surface.

One may appreciate that FIGS. 5A-5H, 6A-6E, and 7A-7G may not necessarily be drawn to scale. For clarity, the relative height of each illustrated item has in some cases been substantially exaggerated to show the relationship between each of the several layers forming the illustrated key. Further, one may appreciate that the application of the legend diffuser material may be applied in any number of ways. As illustrated in each of the related embodiments, one may appreciate that the legend diffuser material is applied to the bottom surface of the keycap. In other embodiments, the legend diffuser material may be applied to the top surface of the keycap. In still further embodiments the legend diffuser material may be applied selectively. For example, individual portions of the legend diffuser material may be applied to select portions of the laser cut or laser ablated areas defining a particular legend. In other embodiments, the legend diffuser material may be deposited in other ways. For example, the legend material may be printed or otherwise layered into the volume defined by laser cuts and laser ablations. In other examples, a cut and/or ablated keycap may be immersed a legend diffuser material.

Figure 8A:
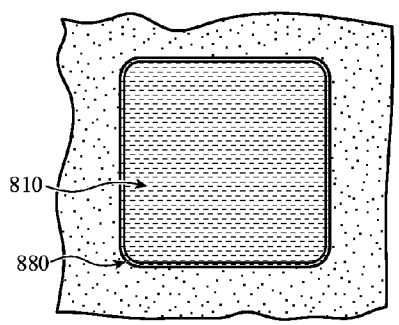
FIG. 8A is a top plan view of a keycap showing illumination of a perimeter portion, a glyph portion, and a background portion in an off state.

FIG. 8A is a top plan view of a keycap showing the selective illumination of a perimeter gap portion 880 in an off state, a legend area portion 818 (not shown) in an off state, and a background area portion 810. One may note that in the illustrated embodiment, a legend portion 818 is not visible. In certain embodiments, the boundaries between the background portion 810 and the legend area portion 818 are not distinguishable when the legend area portion 818 is in an off state. Accordingly, FIG. 8A is illustrated without the legend area visible. In other embodiments, the legend may be visible on the keycap even when the legend or keycap is not illuminated.

Figure 8B:
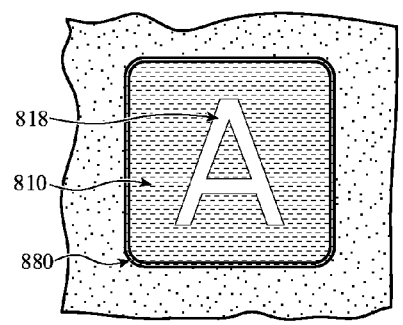
FIG. 8B is a top plan view of a keycap showing illumination of a perimeter portion and a background portion in an off state with the illumination of a glyph portion in an on state.
Figure 8C:
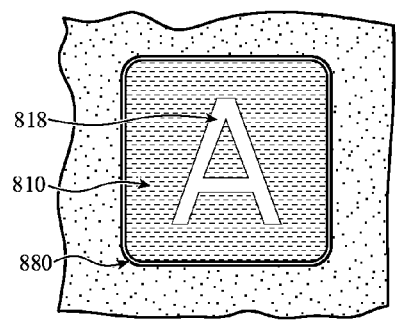
FIG. 8C is a top plan view of a keycap showing illumination of a background portion in an off state with the illumination of a perimeter portion and a glyph portion in an on state.

FIG. 8B is a top plan view of a keycap showing illumination of a perimeter gap portion 880 in an off state and the legend area portion 818 in an on state. Contrary to FIG. 8A, the legend area portion 818 is visible and distinguishable from the background area 810. FIG. 8C is a top plan view of a keycap showing illumination of a perimeter gap portion 880 and a legend area portion 818 in an on state.

Although FIGS. 8A-8C illustrate various combinations of illuminated portions of a keycap, one may appreciate that additional or fewer combinations are contemplated. One may appreciate further that individual keys on the same keyboard may be illuminated separately, sequentially, with differing brightness, for varying durations, with different or similar colors, etc.

Figure 9:
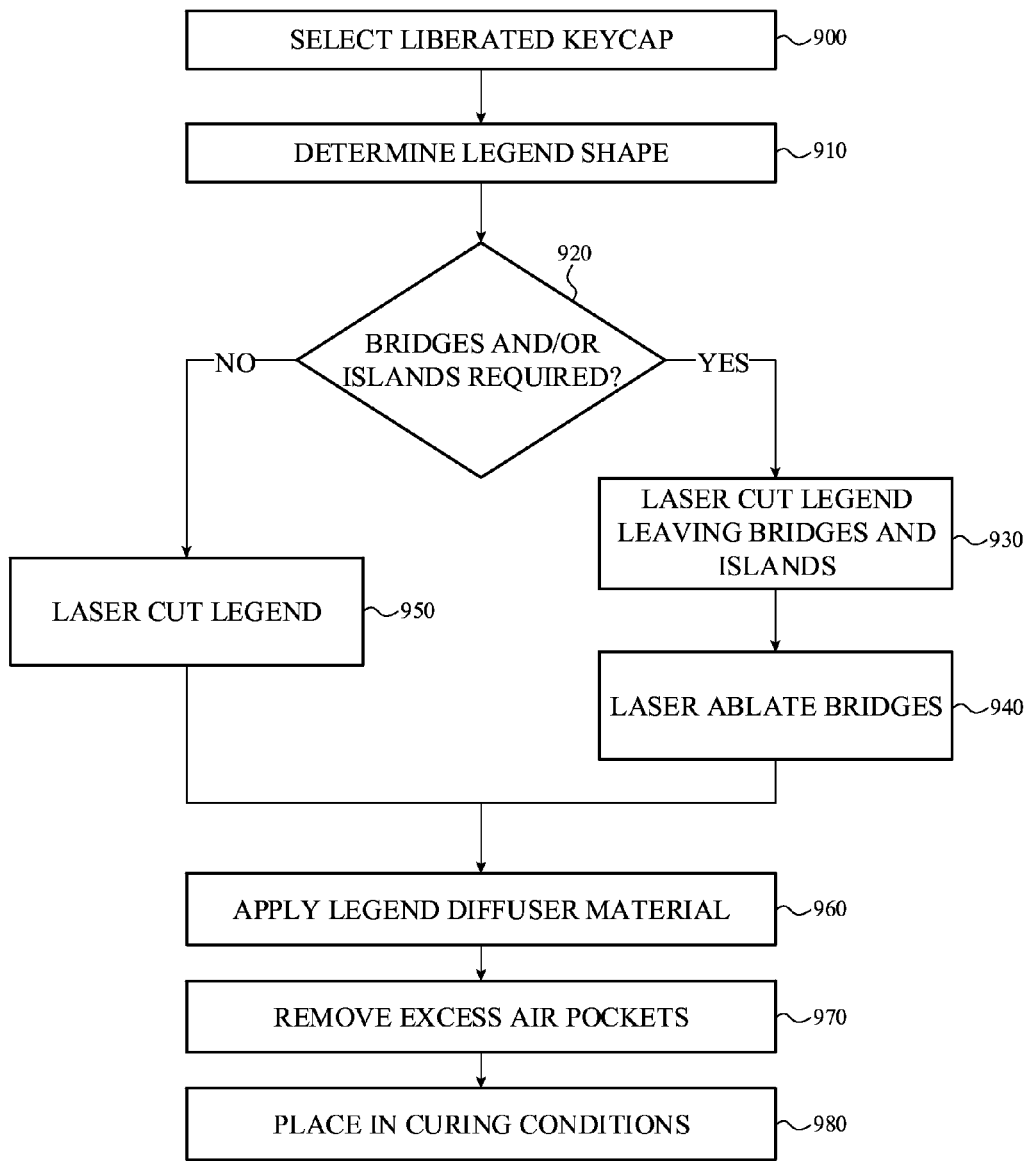
FIG. 9 is a flow chart illustrating operations of a sample method for manufacturing an illuminated input apparatus.

FIG. 9 is a flow chart illustrating operations of a sample method for manufacturing an illuminated input apparatus. The process may begin at operation 900 by selecting a liberated keycap. In certain embodiments, operation 900 may entail selecting a keycap liberated from a mother sheet in a separate process or, alternately, operation 900 may entail liberating a key from a mother sheet.

Next, the process may continue to operation 910 to determine a desired legend shape. As noted above, the legend may take the form of any numeral, symbol or letter of any language appropriately suited to the keyboard as used. For example, the legend may take the form of English letters or symbols in one embodiment or, the legend may take the form of the characters of simplified Chinese. In further embodiments, the legend may take the form of a function symbol such as a power symbol, an eject symbol, or a play/pause symbol. One may appreciate that a legend may include any symbol, character, glyph, or artwork.

Next, the process may continue to operation 920 to determine whether bridges or islands are required to account for one or more counters required to properly illustrate the legend selected in 910. As noted above, a counter is an enclosed negative space within the perimeter of a glyph. Once the number of bridges and islands is determined, the procedure of operation 920 may continue by selectively locating the bridges in order to most efficiently support the islands.

Next, should at least one bridge and island be required per operation 920 for the legend selected in operation 910, the process may continue to operation 930 in which a laser cutting device cuts through the metal keycap selected in operation 900. The laser cutter may leave behind the areas for the bridges and islands.

Next, the process may continue to operation 940 in which a laser ablating apparatus reduces the thicknesses of the bridges left behind in operation 930. The thickness to which the bridges should be reduced may vary from embodiment to embodiment.

Returning to operation 920, should the operation determine that no bridges or islands are required (i.e., the legend selected in operation 910 does not contain a counter), the process may continue to operation 950 in which a laser cutter may be used to cut the entire shape of the legend selected in operation 910.

From either operation 950 or operation 940, the process may continue to operation 960 in which a legend diffuser material may be applied to the keycap. As noted above, the material may be applied in any number of ways.

Once the legend diffuser material is applied to the keycap, the process may continue to operation 970 in which excess air pockets are removed. As noted above, unwanted air pockets may be removed in a vacuum chamber, an autoclave chamber, or any other suitable process.

Thereafter, the process may continue to operation 980 in which the legend diffuser material is cured. At operation 980, the metal keycap and legend diffuser may be placed in curing conditions so that the legend diffuser material may harden and/or adhere to the metal keycap in a substantially permanent fashion. Curing conditions may differ depending on the material selected for the legend diffuser, the material selected for the metal keycap, or other factors. For example curing conditions may include ultraviolet light of a particular wavelength, exposure to heat, or exposure to pressure. The process may conclude at the conclusion of operation 980.

One may appreciate that although many embodiments are disclosed above, that the operations presented in FIG. 9 are meant as examples and accordingly are not exhaustive. One may further appreciate that alternate operation order, or additional or fewer operations may be used to accomplish methods contemplated here.

Where components or modules of the invention are implemented in whole or in part using software, in one embodiment, these software elements can be implemented to operate with a computing or processing module capable of carrying out the functionality described with respect thereto.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

We claim:

1. An illuminated input apparatus for use with a computing device comprising:
   a plurality of keys, each key comprising:
      a metal keycap comprising a body formed entirely from metal and having a top surface defining an external surface of the key;
      a legend aperture defined through the body and intersecting the top surface;
      a legend diffuser material within the legend aperture and flush with the top surface;
      a compressible mechanism configured to support the metal keycap; and
      a light source operable in an on state and an off state, the light source oriented to transmit light through the legend aperture.

2. The illuminated input apparatus of claim 1, wherein the on state comprises a keycap perimeter illumination mode in which the light source emits light proximate a perimeter of the metal keycap.

3. The illuminated input apparatus of claim 1, wherein the on state comprises a legend illumination mode in which the light source transmits light through legend diffuser material and through the legend aperture.

4. The illuminated input apparatus of claim 1, wherein the metal keycap is formed from aluminum.

5. The illuminated input apparatus of claim 1, wherein the legend diffuser material is configured to diffuse light transmitted through the legend aperture.

6. The illuminated input apparatus of claim 1, wherein the metal keycap is anodized.

7. The illuminated input apparatus of claim 1, wherein the legend aperture is formed in the metal keycap using a laser cutting process.

8. The illuminated input apparatus of claim 1, wherein the legend aperture is formed in the metal keycap using a laser ablation process.

9. The illuminated input apparatus of claim 1, wherein the light source comprises a light emitting diode.

10. The illuminated input apparatus of claim 1, wherein a portion of the legend diffuser material is coplanar with the top surface.

11. The illuminated input apparatus of claim 1, wherein the legend aperture is defined in part by at least one bridge portion connecting to an island portion.

12. The illuminated input apparatus of claim 11, wherein the at least one bridge portion has a thickness less than that of the metal keycap.

13. The illuminated input apparatus of claim 12, wherein the at least one bridge portion is formed using a laser ablation process.

14. A method for manufacturing a light transmissive keycap for illuminating a keyboard, comprising:
   forming at least a portion of a legend aperture within a body of a metal keycap, the body formed entirely from metal;
   depositing a translucent legend diffuser material within the legend aperture;
   exposing the metal keycap and the legend diffuser material to a curing condition, thereby curing the legend diffuser material;
   smoothing residual legend diffuser material so that the cured legend diffuser material forms a substantially continuous surface with an external surface of the metal keycap; and
   smoothing residual legend diffuser material so that the cured legend diffuser material forms a substantially continuous surface with a bottom surface of the metal keycap.

15. The method of claim 14, further comprising beveling the edges of the metal keycap.

16. The method of claim 15, further comprising positioning a light emitting element below the metal keycap such that light emitted from the light emitting element transmits through the translucent legend diffuser material and through the legend aperture.

17. The method of claim 14, wherein the legend aperture is cut using a laser cutting process.

18. The method of claim 14, wherein the legend aperture is cut using a laser ablation process.

19. The method of claim 18, wherein the legend aperture is defined by at least one bridge portion and at least one island portion.

20. The method of claim 19, wherein the at least one bridge portion has a thickness less than the uniform thickness of the selected metal keycap.

21. A keyboard comprising:
- a plurality of keys, each key comprising a keycap comprising:
  - a metal body having a uniform thickness and a top surface defining an external surface of the key, the metal body formed entirely from metal;
  - an aperture defined through the metal body defining a legend; and
  - a diffuser fill deposited on a bottom surface of the metal body and through the aperture, the diffuser fill flush with the external surface of the metal body;
- a light emissive layer underlying the plurality of keys; and
- an electrical switch layer comprising a plurality of electrical switches, each of the plurality underlying a respective one of the plurality of keys.

22. The keyboard of claim 21, wherein the light emissive layer comprises a plurality of light emitting diodes.

23. The keyboard of claim 21, wherein the aperture is opened in part by a laser cutting process and in part by a laser ablation process.

\* \* \* \* \*